(12) United States Patent
Torres Robles et al.

(10) Patent No.: US 9,418,195 B2
(45) Date of Patent: *Aug. 16, 2016

(54) LAYOUT CONTENT ANALYSIS FOR SOURCE MASK OPTIMIZATION ACCELERATION

(71) Applicant: Mentor Graphics Corporation, Wilsonville, OR (US)

(72) Inventors: Juan Andres Torres Robles, Wilsonville, OR (US); Oberdan Otto, Camarillo, CA (US); Yuri Granik, Palo Alto, CA (US)

(73) Assignee: Mentor Graphics Corporation, Wilsonville, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 14/480,247

(22) Filed: Sep. 8, 2014

(65) Prior Publication Data
US 2015/0067628 A1  Mar. 5, 2015

Related U.S. Application Data

(63) Continuation of application No. 13/649,962, filed on Oct. 11, 2012, now Pat. No. 8,843,859, which is a continuation of application No. 12/778,083, filed on May 11, 2010, now abandoned.

(60) Provisional application No. 61/177,259, filed on May 11, 2009.

(51) Int. Cl.
*G06F 17/50* (2006.01)
*G06F 19/00* (2011.01)
(Continued)

(52) U.S. Cl.
CPC ........ *G06F 17/5081* (2013.01); *G06F 17/5068* (2013.01); *G01R 31/26* (2013.01);
(Continued)

(58) Field of Classification Search
CPC . G06F 17/5081; G06F 2217/12; G06F 19/00; G03F 1/00; G21K 5/00
USPC ......... 716/54, 52, 55, 56, 112; 430/5; 378/35; 700/110, 121; 438/14
See application file for complete search history.

(56) References Cited

U.S. PATENT DOCUMENTS

| 6,473,665 B2 * | 10/2002 | Mugibayashi | .......... H01L 22/20 |
| | | | 257/E21.525 |
| 6,738,954 B1 * | 5/2004 | Allen | ............... G01R 31/31705 |
| | | | 257/E21.525 |

(Continued)

*Primary Examiner* — Phallaka Kik
(74) *Attorney, Agent, or Firm* — Plumsea Law Group, LLC

(57) ABSTRACT

The invention provides for the acceleration of a source mask optimization process. In some implementations, a layout design is analyzed by a pattern matching process, wherein sections of the layout design having similar patterns are identified and consolidated into pattern groups. Subsequently, sections of the layout design corresponding to the pattern groups may be analyzed to determine their compatibility with the optical lithographic process, and the compatibility of these sections may be classified based upon a "cost function." With further implementations, the analyzed sections may be classified as printable or difficult to print, depending upon the particular lithographic system. The compatibility of various sections of a layout design may then be utilized to optimize the layout design during a lithographic friendly design process. For example, during the design phase, sections categorized as difficult to print may be flagged for further optimization, processing, or redesign. In further implementations, the difficult-to-print sections may be subjected to a source mask optimization process. Subsequently, the entire layout design may receive a conventional resolution enhancement treatment using the optimized source.

16 Claims, 10 Drawing Sheets

(51) Int. Cl.
  G03F 1/00    (2012.01)
  G21K 5/00    (2006.01)
  G06K 9/00       (2006.01)
  G03F 1/38       (2012.01)
  G01R 31/26      (2014.01)
  G03F 1/36       (2012.01)
  H01L 21/66      (2006.01)
  H01L 21/00      (2006.01)

(52) U.S. Cl.
  CPC ............ *G03F 1/0069* (2013.01); *G03F 1/0092* (2013.01); *G03F 1/36* (2013.01); *G03F 1/38* (2013.01); *G06F 19/00* (2013.01); *G06F 2217/12* (2013.01); *G06F 2217/14* (2013.01); *G06K 9/00* (2013.01); *G21K 5/00* (2013.01); *H01L 21/00* (2013.01); *H01L 22/00* (2013.01)

(56) References Cited

U.S. PATENT DOCUMENTS

| | | | |
|---|---|---|---|
| 6,757,645 B2 * | 6/2004 | Chang | G03F 1/26 703/13 |
| 6,871,338 B2 * | 3/2005 | Yamauchi | G06F 17/5068 716/52 |
| 6,873,720 B2 * | 3/2005 | Cai | G01N 21/95607 382/144 |
| 7,096,447 B1 * | 8/2006 | Li | G06F 17/5081 716/112 |
| 7,266,798 B2 * | 9/2007 | Mansfield | G06F 17/5081 716/52 |
| 7,313,777 B1 * | 12/2007 | Yang | G06F 17/5081 716/52 |
| 7,415,386 B2 * | 8/2008 | Burch | G05B 23/024 438/17 |
| 7,512,501 B2 * | 3/2009 | Morinaga | G01N 21/8851 257/E21.53 |
| 7,607,114 B2 * | 10/2009 | Mansfield | G06F 17/5081 716/122 |
| 7,774,187 B2 * | 8/2010 | Izumi | G21C 17/00 703/18 |
| 7,818,151 B2 * | 10/2010 | Coskun | G03F 7/705 703/6 |
| 7,945,410 B2 * | 5/2011 | Morioka | G05B 17/02 700/109 |
| 7,987,435 B2 * | 7/2011 | Ogawa | G03F 1/144 716/51 |
| 8,056,821 B2 * | 11/2011 | Fan | B42D 25/29 235/487 |
| 8,127,265 B2 | 2/2012 | Ogawa et al. | |
| 8,136,056 B2 * | 3/2012 | Scheffer | G06F 17/5081 716/51 |
| 8,214,775 B2 * | 7/2012 | Gergov | G03F 1/14 716/55 |
| 8,356,261 B1 | 1/2013 | Socha | |
| 8,418,088 B2 * | 4/2013 | Ye | G03F 1/144 716/104 |
| 8,566,755 B2 * | 10/2013 | Tsai | G03F 1/144 703/2 |
| 8,799,831 B2 * | 8/2014 | Nehmadi | G01R 31/318511 716/52 |
| 8,843,859 B2 * | 9/2014 | Torres Robles | G06F 17/5068 378/35 |
| 2004/0157134 A1 * | 8/2004 | Kim | G03F 1/72 430/5 |
| 2006/0126046 A1 | 6/2006 | Hansen et al. | |
| 2006/0150132 A1 * | 7/2006 | Gupta | G03F 7/70433 716/51 |
| 2006/0238755 A1 * | 10/2006 | Shibuya | G01N 21/9501 356/237.4 |
| 2006/0269120 A1 * | 11/2006 | Nehmadi | G03F 7/7065 382/145 |
| 2007/0050741 A1 * | 3/2007 | Ogawa | G03F 1/36 716/52 |
| 2007/0050749 A1 * | 3/2007 | Ye | G03F 1/14 430/30 |
| 2007/0083847 A1 * | 4/2007 | Mansfield | G06F 17/5081 716/52 |
| 2007/0124718 A1 * | 5/2007 | Kobayashi | G03F 1/144 430/5 |
| 2007/0256046 A1 * | 11/2007 | Pikus | G06F 17/5068 716/54 |
| 2007/0261013 A1 * | 11/2007 | Mansfield | G06F 17/5081 716/53 |
| 2007/0273853 A1 | 11/2007 | Bleeker et al. | |
| 2008/0003510 A1 * | 1/2008 | Harazaki | G03F 1/36 430/5 |
| 2008/0072207 A1 * | 3/2008 | Verma | G03F 1/84 716/52 |
| 2008/0170774 A1 * | 7/2008 | Xiong | G01N 21/95607 382/144 |
| 2008/0189582 A1 * | 8/2008 | Ho | G11C 29/10 714/718 |
| 2009/0053621 A1 | 2/2009 | Socha | |
| 2009/0135869 A1 * | 5/2009 | Noda | H01S 5/105 372/41 |
| 2009/0210183 A1 * | 8/2009 | Rajski | G01R 31/01 702/84 |
| 2010/0031224 A1 * | 2/2010 | Ogawa | G03F 1/36 716/55 |
| 2011/0075124 A1 | 3/2011 | Socha | |
| 2011/0294263 A1 * | 12/2011 | Ogawa | G03F 1/36 438/113 |

\* cited by examiner

LAYOUT CONTENT ANALYSIS FOR SOURCE MASK OPTIMIZATION ACCELERATION

RELATED APPLICATIONS

This application is a continuation of and claims priority to U.S. patent application Ser. No. 13/649,962, entitled "Layout Content Analysis for Source Mask Optimization Acceleration" and filed on Oct. 11, 2012, which application is incorporated entirely herein by reference. U.S. patent application Ser. No. 13/649,962 is a continuation of and claims priority to U.S. patent application Ser. No. 12/778,083, entitled "Layout Content Analysis for Source Mask Optimization Acceleration" and filed on May 11, 2010, now abandoned, which application is incorporated entirely herein by reference. U.S. patent application Ser. No. 12/778,083 claims priority under 35 U.S.C. §119(e) to U.S. Provisional Patent Application No. 61/177,259 entitled "Layout Content Analysis for Source Mask Optimization Acceleration," filed on May 11, 2009, and names Juan Andres Torres Robles et al. as inventors, which application is incorporated entirely herein by reference.

FIELD OF THE INVENTION

The invention relates to the field of integrated circuit design and manufacturing. More particularly, various implementations of the invention are applicable to source mask optimization techniques.

BACKGROUND OF THE INVENTION

Electronic circuits, such as integrated microcircuits, are used in a variety of products, from automobiles to microwaves to personal computers. Designing and fabricating microcircuit devices typically involves many steps, sometimes referred to as the "design flow." The particular steps of a design flow often are dependent upon the type of microcircuit, its complexity, the design team, and the microcircuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design. These various microcircuits are often referred to as integrated circuits (IC's).

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design is typically described by a Hardware Design Language (HDL), such as the Very high speed integrated circuit Hardware Design Language (VHDL). The logic of the circuit is then analyzed, to confirm that it will accurately perform the functions desired for the circuit.

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing circuit device components (e.g., contacts, channels, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

Integrated circuit layout descriptions can be provided in many different formats. The Graphic Data System II (GDSII) format is popular for transferring and archiving two-dimensional graphical IC layout data. Among other features, it contains a hierarchy of structures, each structure containing layout elements (e.g., polygons, paths or poly-lines, circles and textboxes). Other formats include an open source format named OpenAccess, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in integrated circuit layout designs that are employed to manufacture integrated circuits. Once the microcircuit device design is finalized, the layout portion of the design can be used by fabrication tools to manufacturer the device using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask must be created to expose only the desired areas to the radiation, and to protect the other areas from exposure. The mask is created from circuit layout data. That is, the geometric elements described in layout design data define the relative locations or areas of the circuit device that will be exposed to radiation through the mask. A mask or reticle writing tool is used to create the mask based upon the layout design data, after which the mask can be used in a photolithographic process. The image created in the mask is often referred to as the intended or target image, while the image created on the substrate by employing the mask in the photolithographic process is referred to as the printed image.

As designers and manufacturers continue to increase the number of circuit components in a given area and/or shrink the size of circuit components, the shapes reproduced on the substrate become smaller and are placed closer together. This reduction in feature size increases the difficulty of faithfully reproducing the image intended by the layout design onto the substrate. As a result, current manufacturing yields have declined compared to, for example earlier 0.35 µm or the 0.25 µm process technology nodes. Additionally, manufacturing yields at these smaller nodes are difficult to stabilize even after manufacturing processes have been refined.

A principal reason for declining yields is that, as feature sizes shrink, the dominant cause of defects change. At larger process technologies, yield limitation is dominated by random defects. Despite the best clean room efforts, particles still find a way to land on chips or masks, causing shorts or opens. In smaller process technologies, for example, the nanometer process technologies, the dominant source of yield loss is pattern-dependent effects. These defects are a result of the design's features being smaller than the wavelength of the electromagnetic radiation (e.g. the light) that is being used in the lithographic manufacturing process. As a result, the physical effects of the radiation at these smaller feature sizes must be accounted for.

Various common techniques exist for mitigating these pattern dependant effects. For example, optical process correction (OPC), use of phase shift masks (PSM), or other resolution enhancement techniques (RET) are commonly employed to prepare physical layout designs for manufacturing. Additionally, physical verification techniques that assist in accounting for issues such as planerization and antenna effects are also employed on physical layout designs. Although these extensive modifications to the physical layout design produce a layout design that is virtually unrecognizable by the designer, the resulting manufactured circuit typically matches the designer's intent.

As explained above, resolution enhancement techniques optimize the mask or reticle in order to increase the fidelity of the optical lithographic process. In addition to this, designers typically optimize the mask in tandem with the light source of the optical lithographic process. This is typically referred to as source mask optimization (SMO).

As source mask optimization adjusts the mask variables and the light source variables in tandem, it requires a significant amount of computational resources. In fact, performing source mask optimization on an entire integrated circuit design file would take years to complete. For example, it often takes a few days to perform source mask optimization on layout design sections as small as a few hundred square nanometers. Whereas an entire layout design may be a few hundred millimeters squared. As a result, source mask optimization is currently performed only on select sections of a design, and the balance of the layout design then normally receives only conventional resolution enhancement treatments. Accordingly, techniques to accelerate source mask optimization and also techniques to more appropriately select areas within a design on which to perform source mask optimization are desired in the art.

SUMMARY OF THE INVENTION

Various implementations of the invention provide methods and apparatuses for accelerating a source mask optimization process. In some implementations, a layout design is analyzed by a pattern matching process, wherein sections of the layout design having similar patterns are identified and consolidated into pattern groups. Subsequently, sections of the layout design corresponding to the pattern groups may be analyzed to determine their compatibility with the optical lithographic process, and the compatibility of these sections may be classified based upon a "cost function." With further implementations, the analyzed sections may be classified as printable or difficult to print, depending upon the particular lithographic system.

The compatibility of various sections of a layout design may then be utilized to optimize the layout design during a lithographic friendly design process. For example, during the design phase, sections categorized as difficult to print may be flagged for further optimization, processing, or redesign. In further implementations, the difficult-to-print sections may be subjected to a source mask optimization process. Subsequently, the entire layout design may receive a conventional resolution enhancement treatment using the optimized source.

These and additional implementations of the invention will be further understood from the following detailed disclosure of illustrative embodiments.

BRIEF DESCRIPTION OF THE DRAWINGS

The present invention will be described by way of illustrative embodiments shown in the accompanying drawings in which like references denote similar elements, and in which.

DETAILED DESCRIPTION OF ILLUSTRATIVE IMPLEMENTATIONS

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

The detailed description may also make use of terms like "determine" to describe the disclosed methods. Such terms are high-level abstractions of the actual operations that are performed. The actual operations that correspond to these terms will vary depending on the particular lower level implementation.

Some of the methods described herein can be implemented by software stored on a computer readable storage medium, or executed on a computer. Additionally, some of the disclosed methods may be implemented as part of a computer implemented electronic design automation (EDA) tool. The selected methods could be executed on a single computer or a computer networked with another computer or computers.

Illustrative Computing Environment

Figure 1:
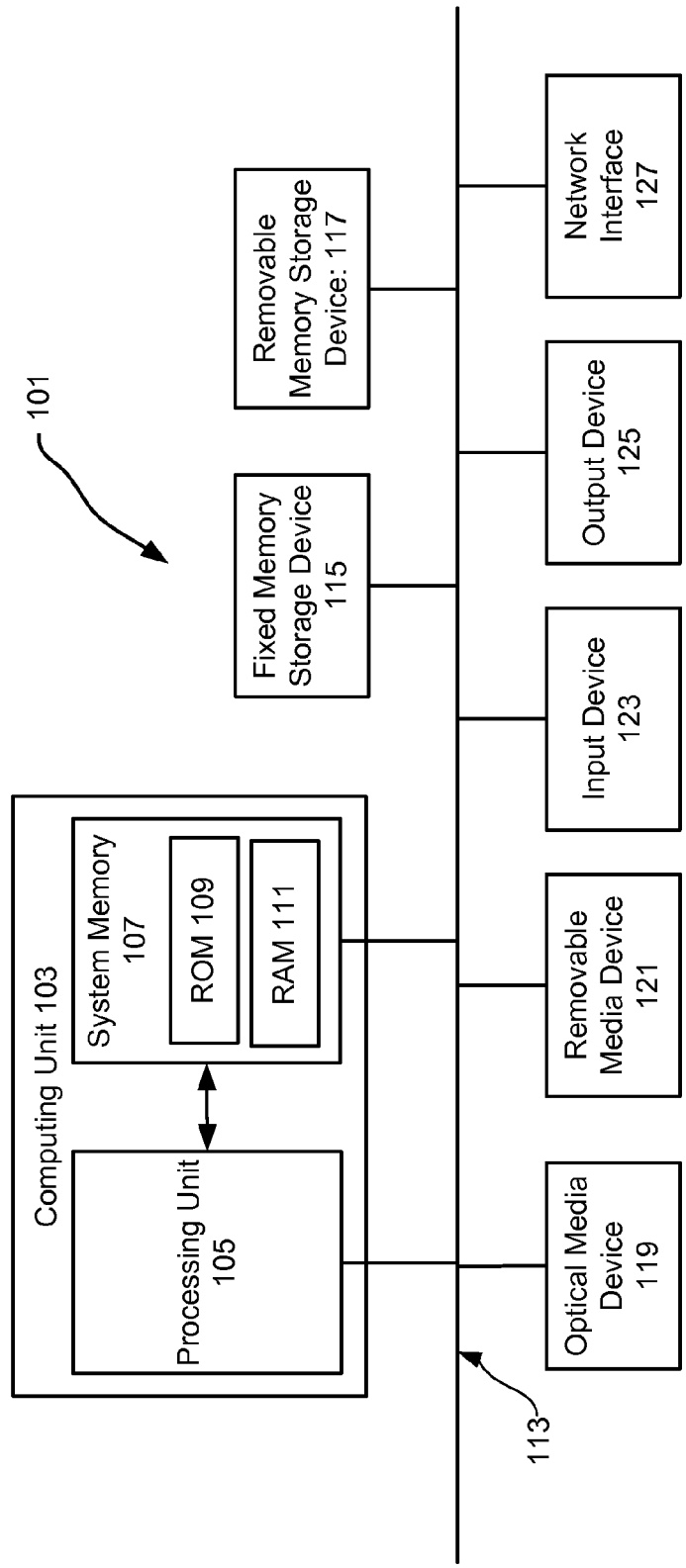
FIG. 1 shows an illustrative computing environment.

A computing environment suitable for implementing the invention is described herein. However, as indicated above, other computing environments not described herein may also be suitable for implementation of the invention. FIG. 1 shows an illustrative computing device 101. As seen in this figure, the computing device 101 includes a computing unit 103 having a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional devices; such as, a fixed memory storage device 115 (e.g., a magnetic disk drive;) a removable memory storage device 117 (e.g., a removable solid state disk drive;) an optical media device 119 (e.g., a digital video disk drive;) or a removable media device 121 (e.g., a removable floppy drive.) The processing unit 105 and the system memory 107 also may be directly or indirectly connected to one or more input devices 123 and one or more output devices 125. The input devices 123 may include, for example, a keyboard, a pointing device (e.g., a mouse, touchpad, stylus, trackball, or joystick), a scanner, a camera, and a microphone. The output devices 125 may include, for example, a monitor display, a printer and speakers. With various examples of the computing device 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection.

Various embodiments of the invention may be implemented using one or more computers that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Optical Lithography and Illustrative Source, Mask, and Layout Shapes

Figure 2:
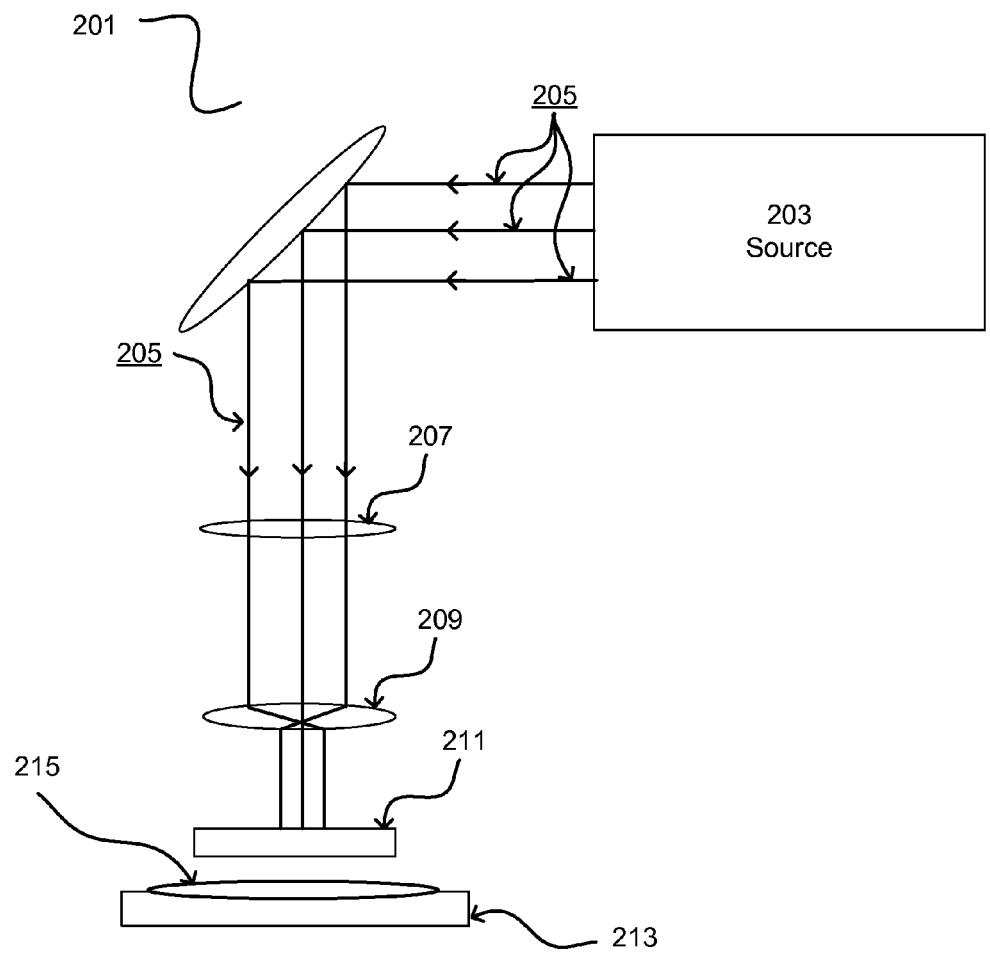
FIG. 2 shows an illustrative optical lithographic system.
Figure 3C:
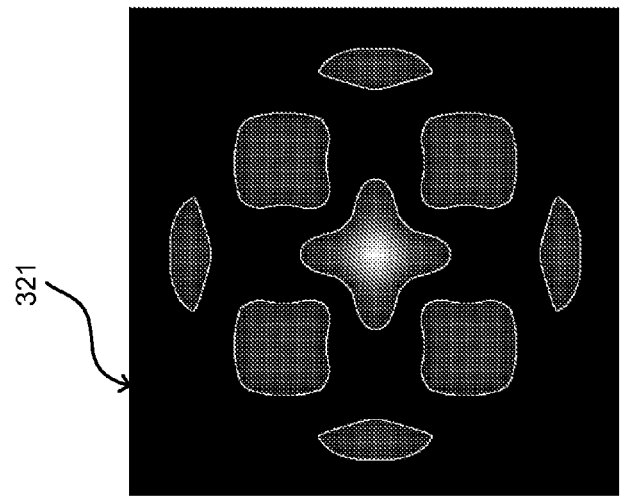
FIG. 3C shows still another illustrative optical aperture.
Figure 3B:
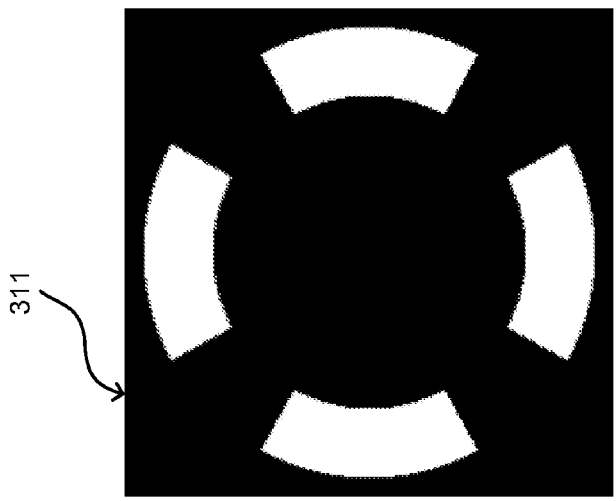
FIG. 3B shows another illustrative optical aperture.
Figure 3A:
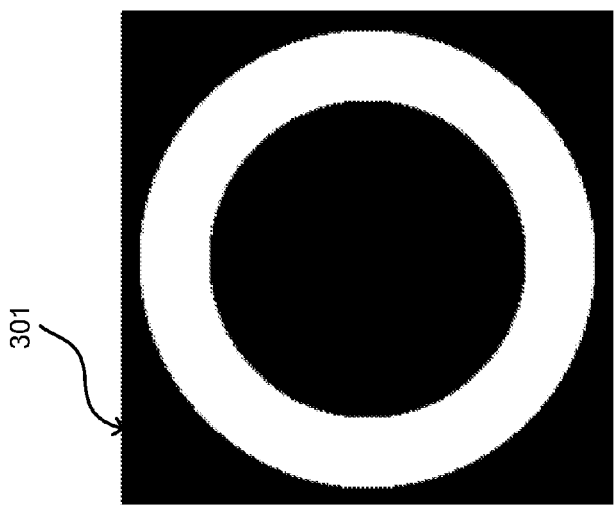
FIG. 3A shows an illustrative optical aperture.

Before describing the various implementations of the present invention in further detail, it is useful to provide an overview of optical lithography and, particularly, source and mask shapes. This overview is discussed with reference to FIG. 2, FIGS. 3A-3C, and FIG. 4 below. FIG. 2 illustrates a lithographic process apparatus 201, suitable for use in conjunction with manufacturing device designs adjusted through application of various implementations of the present invention. As can be seen from this figure, the lithographic process apparatus 201 includes a radiation source 203, which emits radiation 205. Additionally, a source illuminator 207 is shown. As stated above, the source illuminator may have various profiles. Source illuminator profiles were traditionally formed by hard stop apertures, limiting the source profile to simple annular, dipole, and quadrapole shapes. FIG. 3A shows an annular source illuminator profile 301 that may be formed by a hard stop aperture. Additionally, FIG. 3B shows a quadrapole source illuminator profile 311 that may be formed by a hard stop aperture. Both profiles 301 and 311 may be employed in a lithographic process to control the brightness and shape of the radiation 205. In addition to traditional hard stop apertures, programmable sources are now available, which make it possible to generate complex source shapes. FIG. 3C shows a complex source illuminator profile 321. A common programmable source employed in lithographic processes is a diffractive optical element (DOE). Diffractive optical elements work similar to a hologram to produce the desired light pattern from an incoming light source such as a laser. Optimization of the source illumination variables, such as, for example, during a source mask optimization process, may be performed on both hard stop apertures and programmable sources.

Figure 4:
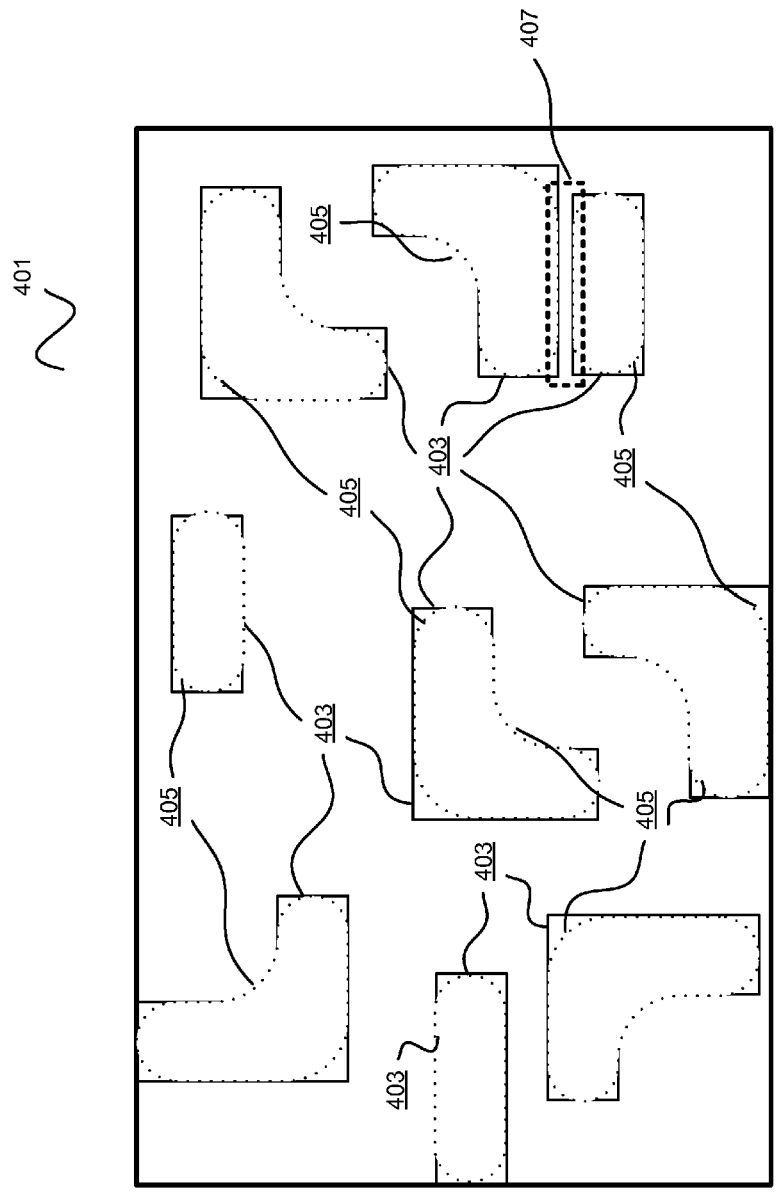
FIG. 4 illustrates a layout design.

Returning to FIG. 2, the lithographic process apparatus 201 includes a lens 209 for controlling the uniformity of the radiation 205, a mask 211 and an alignment table 213 holding a substrate 215. The alignment table 213 is used to position the substrate 215 with respect to the radiation 205 and the mask 211. The mask 211, as described above, is used to prevent radiation from contacting specific areas of the substrate 215. FIG. 4 shows a mask 401. As can be seen from this figure, the mask 401 has transparent areas 403 that would permit the radiation 205 to pass through.

Masks are created from layout design data, which describes the geometric features that should be manufactured onto the substrate 215. For example, if a transistor should have a rectangular gate region, then the layout design data will include a rectangle defining that gate region. This rectangle in the layout design data is then implemented in a mask for "printing" the rectangular gate region onto the substrate.

As shown in FIG. 4, the mask 401 has a plurality of shapes 403 that will allow for the transmission of radiation onto a substrate. However, as indicated above, optical effects, such as, for example, diffractive effects, may prevent certain shapes or combinations of shapes in a mask from being faithfully imaged onto a substrate. For example, printed shapes 405 shown in FIG. 4 may be imaged onto the substrate 215 if the mask 401 were used in the optical lithographic apparatus 201. As can be seen, the printed shapes 405 depart slightly from the intended shapes 403 (i.e. the shapes 405 are much more rounded in the corners.) As the mask shapes (e.g. the shapes 403) become smaller relative to the wavelength of radiation used in the optical lithographic process, these distortions become more pronounced.

As stated, the source employed in the photolithographic process (i.e. the source 203 and the illuminator 207) also affects how the shapes defined by the mask 211 are imaged onto the substrate 215. Particularly, certain shapes or combinations of shapes are more easily printed via selected optical sources. Conversely, certain sources have difficulty printing, and in some cases are unable to print, some shapes or combinations of shapes. For example, shapes 403 that are too close proximally to each other, such as, for example, the shapes overlapping the highlighted section 407, may not be able to be accurately printed. Accordingly, these shapes 403 would need to be moved and or adjusted at the location 407. This adjustment can take place during the design phase, wherein a functionally equivalent design having a different layout pattern would replace the design represented by the shapes in the layout section 409. Alternatively, the adjustment can take place prior to mask creation, wherein the shapes in the layout section 407 may be adjusted such that the shapes produced from implementing the adjusted mask in an optical lithographic process accurately represent the shapes intended by the layout design. Furthermore, the source employed in the optical lithographic process may be modified such that the printed shapes more closely match the shapes intended to be printed.

Layout Analysis Content Analysis

Figure 5:
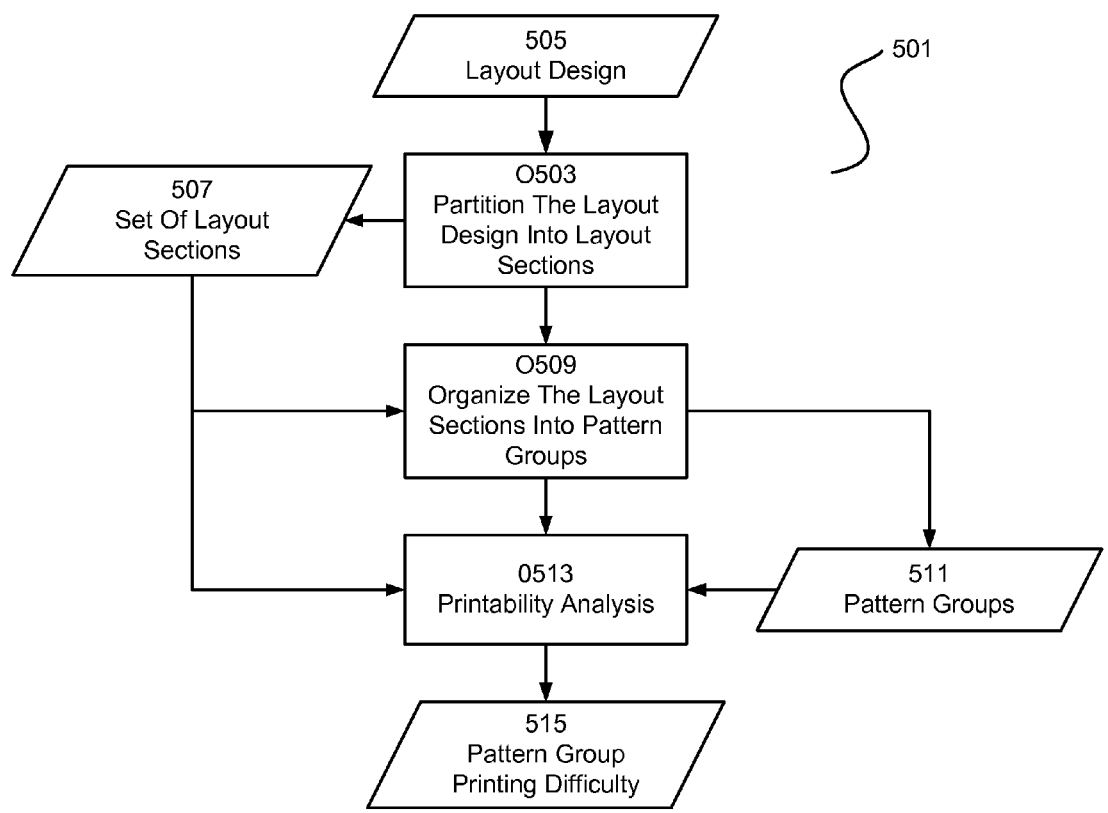
FIG. 5 illustrates a method of selecting areas within a layout design or optimization according to various implementations of the invention.

As indicated above, various implementations of the invention provide techniques for identifying areas within a layout design that may benefit from subsequent source mask optimization treatments. FIG. 5 illustrates a method 501 that may be provided by various implementations of the invention to select areas within the layout that should receive a source mask optimization treatment. As can be seen from this figure, the method 501 includes an operation 503 for partitioning a layout design 505 into layout sections, resulting in a set of layout sections 507. The method 501 also includes an operation 509 for organizing the set of layout sections 507 into pattern groups 511. Furthermore, the method 501 includes an operation 513 for performing a printability analysis on the pattern groups 511, resulting in a pattern group printing difficulty factor 515.

As discussed above, a layout design describes the shapes that are intended to be created through an optical lithographic system, while a mask describes transparent areas that will allow the transmission of radiation during an optical lithography process. As detailed above, due to optical phenomena, the shapes described by the mask are typically not the same as the shapes described in the layout design, although the printed shapes resulting from employment of the mask in an optical lithographic process are similar to the target shapes. Accordingly, knowledge of both the layout shapes and the mask shapes is needed when performing resolution enhancement techniques as well as during many of the techniques described herein. More particularly, whenever an optical lithographic process is simulated, the mask shapes are required for the simulation process. Furthermore, in order to determine whether the simulated shapes match the intended shapes, the layout design shapes are needed.

As used herein, the term "layout design" may refer to the actual target shapes as well as a mask corresponding to the target shapes. Although a difference between the actual layout design shapes and the mask shapes may often be apparent from the context, the reader is advised that, where a process step indicates performing some act on a "layout design," the act may refer to either the actual layout or the mask layout as stated. Additionally, the term "layout design" may be used herein to refer to both the "target layout" (i.e. the shapes intended by be manufactured,) and the "simulated layout" (i.e. the manufactured shapes as determined by a simulation of the lithographic process.)

Layout Partitioning and Pattern Group Consolidation

Figure 6:
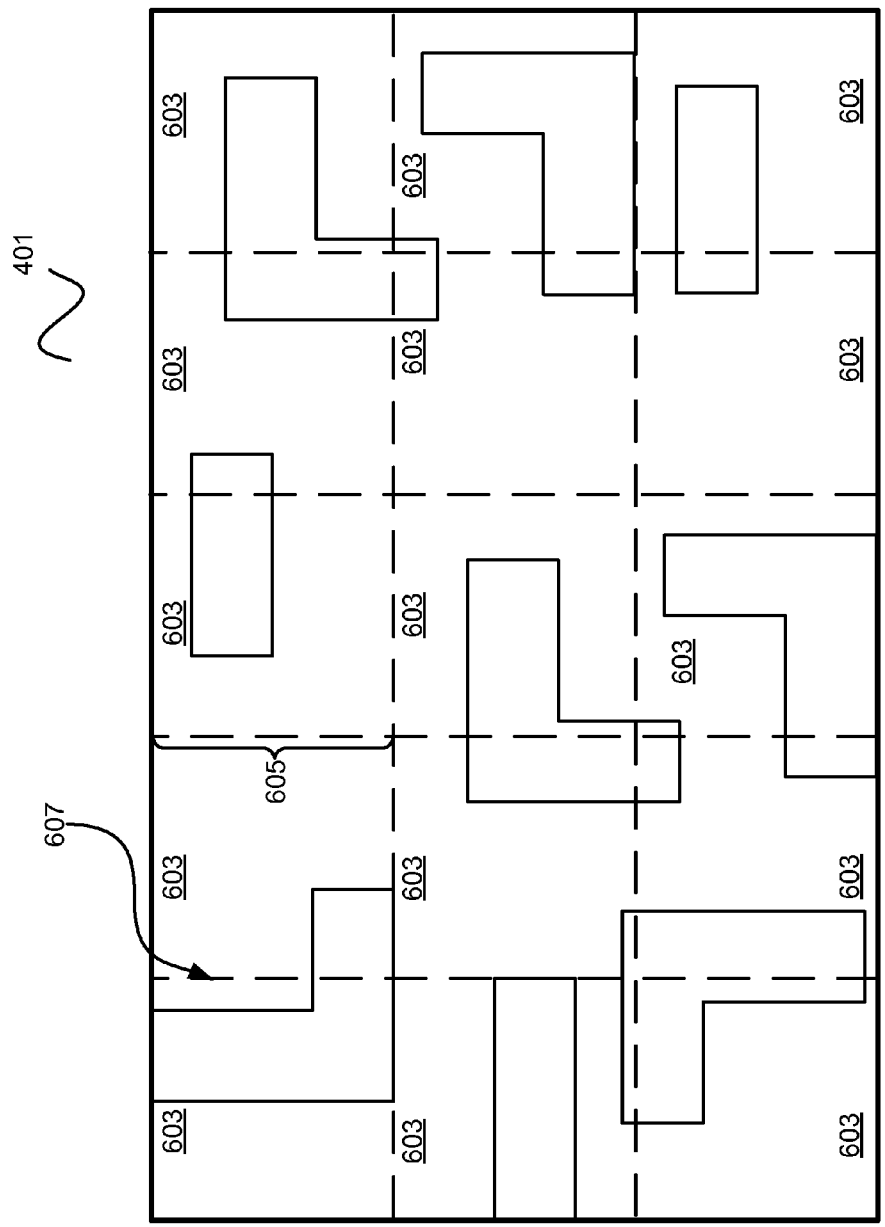
FIG. 6 illustrates the layout design of FIG. 4 partitioned into layout sections.

As stated, the method 501 includes the operation 503 for partitioning the layout design 505 into the set of layout sections 507. In various implementations, the layout design 505 is divided into a plurality of layout sections of similar geographic area. For example, FIG. 6 illustrates the layout design 401 of FIG. 4, partitioned into a plurality of layout sections 603. With various implementations of the invention, the layout sections 603 are formed by identifying a partition distance 605, forming a planar grid 607 based upon the partition distance, and overlaying the planar grid 607 onto the layout design to define the layout design sections 603, as illustrated in FIG. 6.

Figure 7:
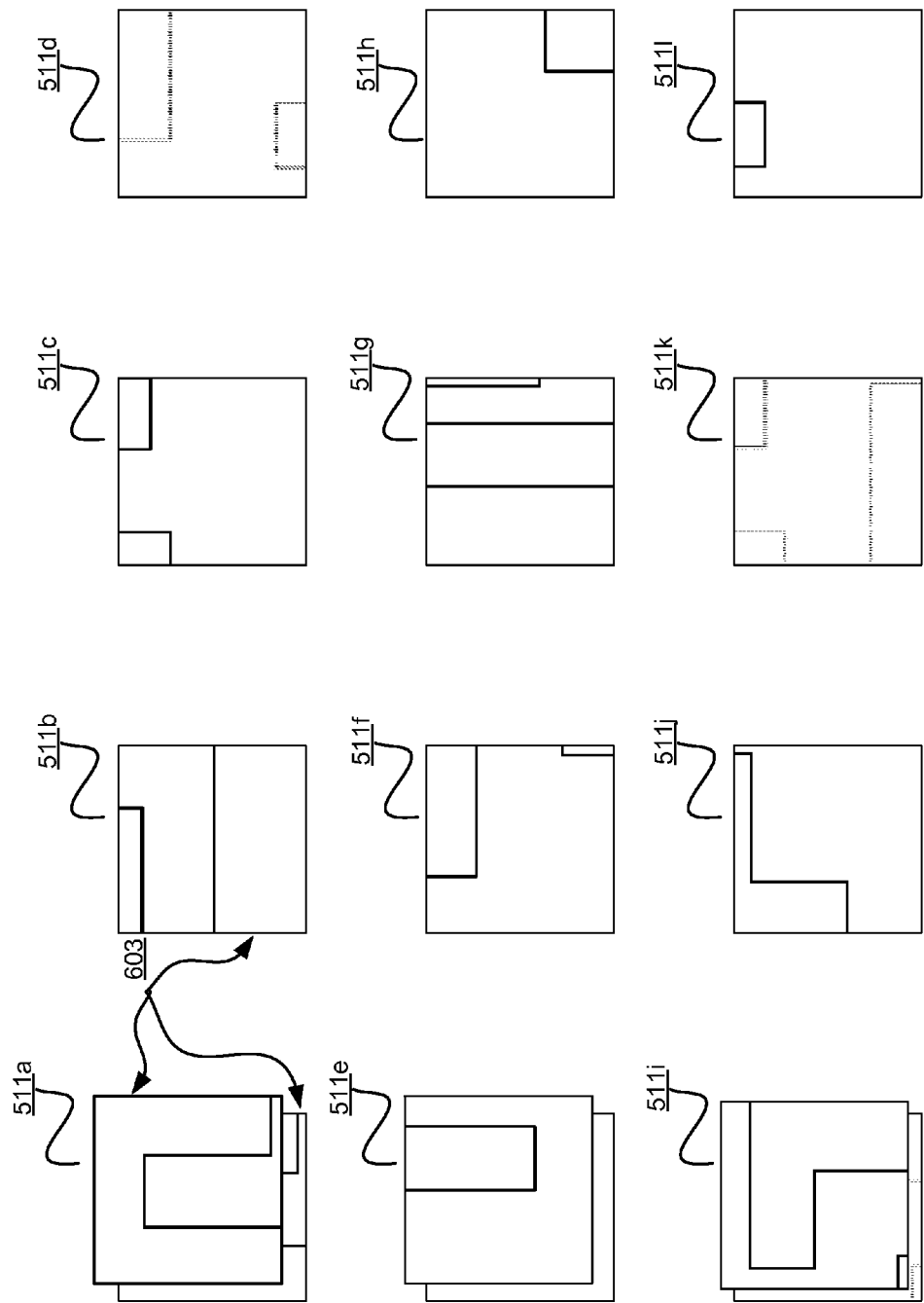
FIG. 7 illustrates the layout sections of FIG. 6 organized into pattern groups.

Returning to FIG. 5, the method 501 includes the operation 509 for organizing the set of layout sections 507 into pattern groups 511. In various implementations of the invention, the operation 509 identifies ones of the set of layout sections 507 having similar design features and forms a pattern group 511 from the similarly identified layout sections. For example, FIG. 7 illustrates the layout sections 603 of FIG. 6, consolidated into pattern groups 511a-511l. As can be seen from this figure, the pattern groups 511 contain selected ones of the layout sections 603. Additionally, as can be seen, a pattern group has been formed to correspond with each of the layout sections 603 that have a unique pattern. For example, the pattern groups 511a, 511e, and 511i respectively contain layout sections of similar patterns.

In various implementations, the operation 509 organizes the layout sections into pattern groups 611 by selecting a reference point within each layout sections. Subsequently, using geometric pattern matching techniques, the operations 509 identifies those layout sections that have similar geometric structures or shapes to each other relative to the reference point. Accordingly, layout sections may be classified into the same pattern group based upon the shape structure relative to some point, such as, for example, the center of the layout section. As a result, layout sections having a similar structure but different orientation relative to the entire layout may still be grouped into the same pattern group.

Figure 8:
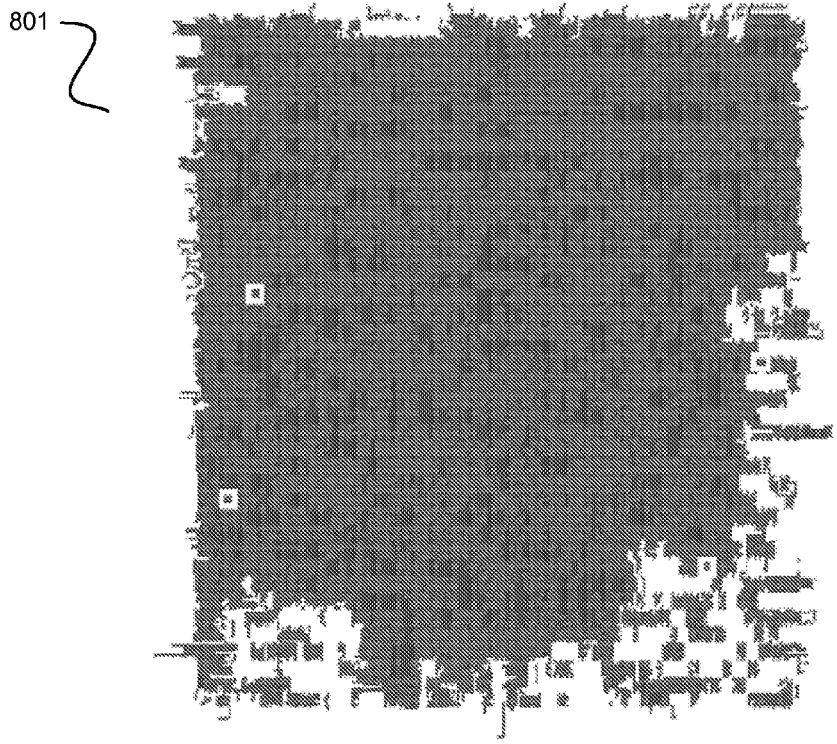
FIG. 8 illustrates a layout design.

Those of skill in the art will appreciate that layout designs are vastly more complex than the simplified examples illustrated in FIG. 4, FIG. 6, and FIG. 7. In fact, modern layout designs may contain thousands of unique patterns. For example, FIG. 8 illustrates an exemplary layout pattern 801. As can be seen from this figure, the layout design 801 contains significantly more features or shapes than detailed in the illustrative layout design 401. Accordingly, many pattern groups 509 may be formed for a typical layout design. However, the number of pattern groups and, additionally, the number of layout sections associated with each pattern group, depends upon the partition distance 605. For example, for the layout design 801 and a partition distance of 100 nanometers, 2188 unique layout patterns were identified. Alternatively, for a partition distance of 75 nanometers, 2116 unique layout patterns were identified. Alternatively still, when a partition distance of 50 nanometers is used, 1855 unique layout patterns were identified.

As mentioned above, a partition distance 605 is selected when forming the layout sections 603. In various implementations, it may be advantageous to select a partition distance 605 that provides a significant number of repetitive structures.

As those of skill in the art can appreciate, larger partition distances 605 correspond to less numbers of repetitive structures. More particularly, the larger the partition distance 605, the more unique patterns will be identified. In some cases, where few repetitive patterns are identified, source mask optimization techniques may be unable to find a solution to the optimization problem.

With alternative implementations, when forming pattern groups, the operation 509 may take into account shapes, portions of shapes, or other features adjacent to the particular sections. For example, given a partition distance of 75 nanometers, each layout section will have an approximate dimension of 75 nanometers by 75 nanometers. However, the operation 509 may only identify layout sections as "similar" if the layout features within a given distance (e.g. 25 nanometers) outside the dimensions of the layout section are also similar.

Printability Analysis

Returning to FIG. 5, the method 501 includes the operation 513 for performing a printability analysis on one or more of the layout sections 507. In various implementations of the invention, the operation 513 performs a printability analysis on a representative layout section for each pattern group 509. More particularly, the operation 513 may cause a printability analysis to be performed on one or more of the layout sections 507 from each of the pattern groups 511. For example, a one of the layout sections 603 from each of the pattern groups 511a-511l. With other implementations of the invention, the operation 513 performs a printability analysis on one or more of the layout sections 507 from selected ones of the pattern groups 511.

As used herein, a printability analysis seeks to characterize the likelihood that a pattern group, or a layout section 507 representative of the pattern group, will be accurately manufactured by a selected optical lithographic process. Accordingly, a printability analysis is often context sensitive. In various implementations of the invention, a specific pattern of shapes, or a section of a layout design, may be defined as "printable" by an optical lithographic system if, given a description of the optical lithographic system (e.g. the wavelength of radiation (λ), the numerical aperture (NA), and the illumination function), it is determined that various optical image tolerances can be met. With some implementations of the invention, the optical image tolerances may be a dose process window, and/or a defocus process window, and/or an edge placement tolerance. With further implementations, the optical image tolerances are said to be met if the specific pattern of shapes or the section of the layout design can be produced without introducing spurious contours.

Figure 9:
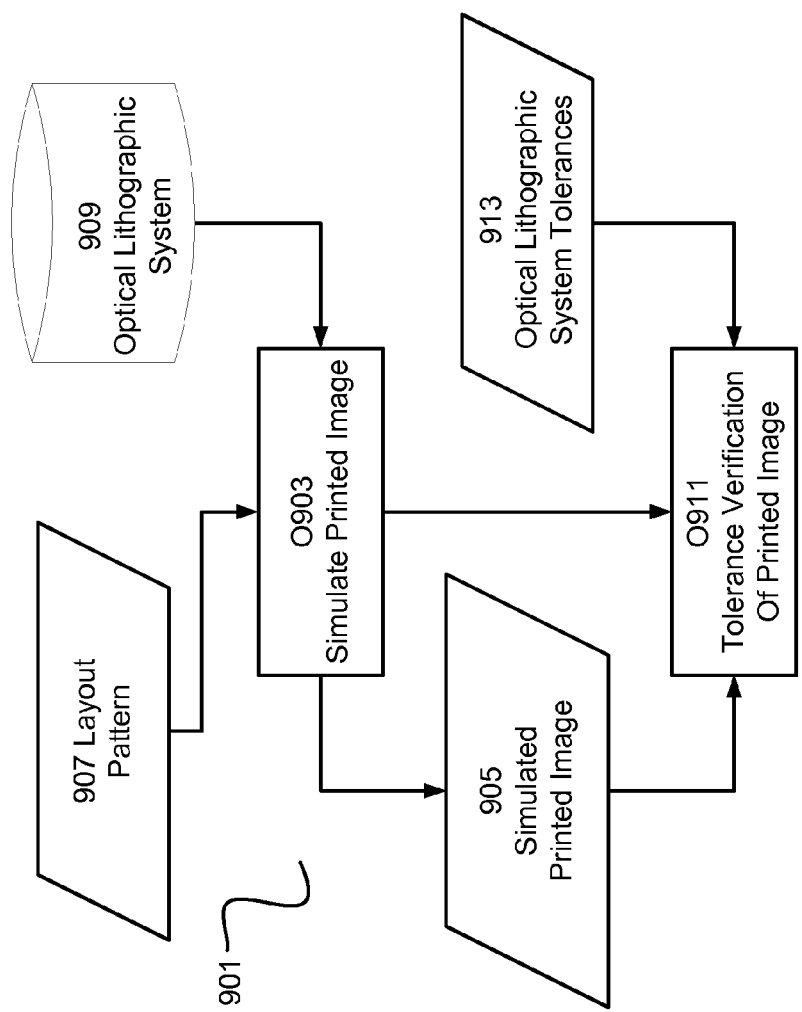
FIG. 9 illustrates a method of determining the printability of a portion of a layout design.

FIG. 9 illustrates a method 901 for performing a printability analysis on a layout section 507. In various implementations of the invention, the operation 513 performs the method 901 on one or more of the set of layout sections 507 as described above. As can be seen from this figure, the method 901 includes an operation 903 for simulating a printed image 905 corresponding to the implementation of an optical lithographic system 909 on a layout pattern 907. As illustrated, the implementation of the optical lithographic system 909 is shown as a database. As will be appreciated by the following discussion, an optical lithographic system may be modeled based upon a collection of parameters describing the system. The method 901 additionally includes an operation 911 for verifying that the simulated printed image 905 falls within the optical image tolerance parameters 913.

Returning to FIG. 5, as indicated, the operation 513 performs a printability analysis on ones of the set of layout sections 507, such as, for example, those corresponding to each of the pattern groups 511. This may be facilitated by deriving a modulation transfer function of the optical lithographic system 909, such as, for example, by utilization of the following equations, and then subsequently determining the relative difference between the target optical intensity values and the simulated or derived optical intensity values at various sampling points (e.g. x,y) within the layout pattern 907 (e.g. which may be a section from the set of layout sections 507.)

In various implementations of the invention, the operation 903 simulates the image 905 by identifying a mask (M) that corresponds to the optical intensity (I) for the layout pattern 907, as illustrated by the following equations, where OSP equals the parameters of the optical system 909.

$$I(x,y)=OSP \cdot M(x,y) \therefore M(x,y)=OSP^{-1} \cdot I(x,y) \quad (1)$$

Assuming that the mask (M) is composed of a symbolic mask ($M_0$) and a real mask ($M_1$), printability may be verified by the operation 911 by optimizing the real mask ($M_1$) such that the value of the mask (M) satisfies the image tolerance parameters. For example, if the mask is a binary mask, i.e. sections of 100% transmission and sections of 0% transmission, only values of 1 and 0 (or values within a selected tolerance value from 1 and 0) are permitted for the mask. In various implementations of the invention, if the values of the mask are within a root mean squared deviation from the tolerance values, they will be accepted. The operations 903 and 911 for simulating and optimizing a mask make use of various formulas to represent the optical lithographic system 909 that are explained in greater detail below.

Modulation Transfer Function

As stated above, with various implementations of the invention, a mask is simulated and optimized, which requires knowledge of the parameters of the optical lithographic system 909 as well as the image intensity at the mask. In various implementations of the invention, a modulation transfer function (MTF) may be employed to represent the image intensity. More particularly, a modulation transfer function may be employed to represent the absolute value of the latent image intensity for a cosine modulation over the range of acceptable values for the mask. With various implementations of the invention, the range of acceptable values depends upon the type of mask. For example, for binary masks, the range of acceptable values may be [0,1]. For attenuated phase shift masks, the range of acceptable values may be $[-\sqrt{Attn},1]$, where Attn is the degree of attenuation. For strong, i.e. Levinson, phase shift masks, the range of acceptable values may be $[-1,1]$.

With various implementations of the invention, the modulation transfer function is the Fourier transform of the intensity point spread function corresponding to the optical lithographic system 909. Equation (2) shows an intensity point spread function (PSF).

$$PSF(x,y)=E_{field}(x,y) \cdot \overline{E_{field}(x,y)} \quad (2)$$

Accordingly, the modulation transfer function may be represented as the Fourier transform on the point spread function defined by Equation (2), as shown by the following equation.

$$MTF(k_x,k_y)=F(PSF(x,y))=F(E_{field}(x,y)) \otimes \overline{F(E_{field}(x,y))} \quad (3)$$

Where $F(E_{field}(x,y))$ is the illumination function (IF) corresponding to the optical lithographic system 909. As a result, the modulation transfer function represents the autocorrelation of the illumination function.

With various implementations of the invention, it is useful to identify the set of wave vectors k where the value of the modulation transfer function is greater than a selected threshold. Accordingly, the printability modulation transfer function may be defined by Equation (4) and Equation (5).

$$MTF_{Printability} = \text{Threshold}(MTF_{Printability,0}, \text{theshold}) \quad (4)$$

$$MTF_{Printability,0} = MTF_{Aperture\&Defocus} \cdot MTF_{resistBlur} \quad (5)$$

In various implementations of the invention, all values of the modulation transfer function below the threshold value are set to zero. More particularly, only those components of the Fourier transform for which the threshold modulation transfer function are non-zero are permitted to remain non-zero during the simulation and optimization. The set of wave vectors k where the value of the modulation transfer function is non zero is often referred to as $\Omega$.

For various implementations, the Aperture and Defocus modulation transfer function ($MTF_{Aperture\&Defocus}$) may be the modulation transfer function defined by Equation (6).

$$MTF_{Aperture\&Defocus} = (F^{-1}(IF \cdot Defocus) \cdot \overline{F(IF \cdot Defocus)}) \quad (6)$$

Wherein IF is the illumination function for the optical lithographic system 1009, as stated above, and Defocus is the quadratic phase function of the aperture for the optical lithographic system 909, as given by Equation (7) below. With respect to the illumination function, the Fourier transform coefficient k, (i.e. the scaling of the spatial position of the aperture to the wave vector of the illumination source) may be defined by Equation (8).

$$Defocus = e^{i2\pi\left(\frac{x^2+y^2}{R^2}\right) \cdot DefocusPower} \quad (7)$$

$$k_x = \frac{x}{R} \frac{2\pi \cdot NA}{\lambda} \quad (8)$$

Where NA is the numerical aperture, R is the radius of the aperture, and is the wavelength of the illumination source. Additionally, the change in Defocus, or the quadratic phase shift at the aperture edge may be defined by Equation (9) and the maximum k vector of the autocorrelation of the illumination function ($k_{max}$) may be defined by Equation (10).

$$\Delta_{Defocus} = DefocusPower \cdot \frac{\lambda}{\sqrt{1 - NA^2}} \quad (9)$$

$$k_{max} = 4\pi NA/\lambda \quad (10)$$

For various implementations of the invention, the resist-Blur modulation transfer function ($MTF_{resistBlur}$) may be the modulation transfer function defined by Equation (11).

$$MTF_{resistBlur} = e^{-\frac{(k_x^2+k_y^2)\sigma^2}{4}} \quad (11)$$

$$Blur(x, y) = \frac{\sigma^2}{\pi} e^{-\left(\frac{x^2+y^2}{\sigma^2}\right)} \quad (12)$$

Where Equation (12) represents the spatial blur function, which in effect is the convolution of the blur function with the intensity function for the optical lithographic system 909.

Returning to FIG. 5, as described above, the operation 513 perform a printability analysis on ones of the set of layout sections 507, such as, for example, those corresponding to each of the pattern groups 511. As described above, this may be facilitated by deriving the modulation transfer function of the optical lithographic system, such as, for example, by utilization of the equations detailed above, and subsequently determining the relative difference between the target optical intensity values and the simulated or derived optical intensity values at various sampling points (e.g. x,y) within the layout pattern 907 (e.g. which may be a section from the set of layout sections 507.)

As shown in FIG. 5, the operation 513 derives the pattern group printing difficulty 515. The printing difficulty 515 is often referred to as the printing difficulty factor. In various implementations, the printing difficulty factor is the sum of the relative difference between the target intensity the simulated intensity. With some implementations, as described above, the intensities are taken at various sampling points within the layout section. With further implementations, multiple iterations of the method 501 are performed and the pattern group printing difficulty factor is derived based upon an average of the derived difficulty factors. With alternate implementations, the difficulty factor is based upon the difficulty factor derived during the final iterations.

Fourier Expansion of Image Intensity

As printing difficulty is a measure of the relative difference between the target intensities of the actual (or simulated) intensities as various sampling points within a given area, such as, for example, a layout section, it is beneficial to define the Fourier expansion of intensity. The Fourier expansion of the optical intensity may be defined by the following equations.

$$U(r) = \alpha_{00} + A1 + A2 \quad (13)$$

$$A1 = \sum_{\substack{n=1 \\ k_{0n} \in \Omega}}^{N} (\alpha_{0n}\cos(k_{0n} \cdot r) + \beta_{0n}\sin(k_{0n} \cdot r)) \quad (14)$$

$$A2 = \sum_{m=1}^{M} \sum_{\substack{n=-N \\ k_{mn} \in \Omega}}^{N} (\alpha_{mn}\cos(k_{mn} \cdot r) + \beta_{mn}\sin(k_{mn} \cdot r)) \quad (15)$$

Where $$k_{mn} = 2\pi\left(\frac{m}{L_x}, \frac{n}{L_y}\right),$$

r=(x,y), and $\alpha_{mn}, \beta_{mn}$ are real numbers, $\Omega$ is the domain of k vectors where the thresholded $MTF_{Printability}$ is non-zero. Additionally, $M \leq 2L_x NA/\lambda$ and $N \leq 2L_y NA/\lambda$ where $L_x$ and $L_y$ are the x and y spatial extents of the intensity field being derived and the coefficients $\alpha_{mn}$ and $\beta_{mn}$ for which $k_{mn} \in \Omega$ are the subjects of an optimization of the thresholded $MTF_{Printability}$.

With various implementations of the invention, $\alpha_{00}$, is the energy transmission ratio of the mask may be defined by Equation (16).

$$\alpha_{00} = \frac{F(Intensity_{PostMask})_{k=0}}{F(Intensity_{PreMask})_{k=0}} = \frac{\sum_k FMask(-k) \cdot MTF(k)}{MTF(0)} \quad (16)$$

Where, $F(Intensity_{PostMask})_{k=0}$ is the energy transmitted through the mask and $F(Intensity_{PreMask})_{k=0}$ is the energy incident upon the mask. The derivation of both $F(\text{Intensity}_{PostMask})_{k=0}$ and $F(\text{Intensity}_{PreMask})_{k=0}$ is illustrated below.

$$E_{PreMask}(x,y) \propto F(\text{Illum}) \tag{17}$$

Applying Kohler Illumination, each point in Illum is a plane wave at the mask, accordingly, $$E_{PreMask}(x,y) \cdot \overline{E_{PreMask}(x,y)} \propto F(\text{Illum}) \cdot \overline{F(\text{Illum})} \tag{18}$$

$$E_{PreMask}(x,y) \cdot \overline{E_{PreMask}(x,y)} \propto F(\text{Illum}) \cdot \overline{F(\text{Illum})} \tag{19}$$

$$F(\text{Intensity}_{PreMask}) \propto F(F(\text{Illum}) \cdot \overline{F(\text{Illum})}) = \text{Illum} \otimes \overline{\text{Illum}} \tag{20}$$
$$= MTK(k)$$

$$F(\text{Intensity}_{PreMask})_{k=0} = \iint_{MaskArea} \text{Intensity}_{PreMask}(x,y)dxdy \propto MTF(0) \tag{21}$$

$$E_{PostMask}(x,y) = MaskTransmission(x,y) \cdot E_{PreMask}(x,y) \tag{22}$$

$$\text{Intensity}_{PostMark}(x,y) = \tag{23}$$
$$|MaskTransmission(x,y)|^2 \cdot \text{Intensity}_{PreMask}(x,y)$$

$$F(\text{Intensity}_{PostMask}) = \tag{24}$$
$$F(|MaskTransmission(x,y)|^2 \cdot \text{Intensity}_{PreMask}(x,y))$$

Letting $F(\text{Mask}(k) = F(|MaskTransmission(x,y)|^2)$, (25)
then $F(\text{Intensity}_{PostMask}) \propto FMask(k) \otimes MTK(k)$ More particularly, each incident diffraction order is in turn diffracted by the mask and as a result, $$F(\text{Intensity}_{PostMask})_{k=0} = \iint_{MaskArea} \text{Intensity}_{PostMask}(x,y)dxdy \tag{26}$$

Mask Optimization

Referring back to Equation (1), as detailed above, the mask (M) may be composed of a real mask ($M_1$) and a symbolic mask ($M_0$). Furthermore, printability may be verified by the operation 911 by optimizing the real mask ($M_1$) such that the value of the mask (M) satisfies the image tolerance parameters 913. With some implementations of the invention, this between the real ($M_1$) and symbolic ($M_0$) masks may be characterized by the following equations.

$$M(x,y) = M_0(x,y) + (x,y) \tag{27}$$

Accordingly, Equation (1) may be rewritten as follows.

$$M_1(x,y) = OSP^{-1} \cdot I(x,y) - M_0(x,y) \tag{28}$$

In various implementations of the invention, the optimization of the real mask ($M_1$) may require the resist edges ($\epsilon$) to pass through the following points.

$$r_j^- = r_j - n_j\epsilon_{0j} \text{ and } r_j^+ = r_j + n_j\epsilon_{1j} \tag{29}$$

Where r is the sample position of the target edges and n is the edge normal (i.e. points towards increasing intensity). This is the equivalent of the following conditions.

$$U(r_j^-) \leq t/(1+\Delta dose/dose) \tag{30}$$

$$U(r_j^+) \geq t/(1+\Delta dose/dose) \tag{31}$$

Where t=dosetoClear/dose, whose dose is an optical image parameter and dosetoClear is a threshold value for the nominal printability contour location U=t. Additionally, in various implementations, the sample spacing follows the Nyquist interval, i.e.

$$\delta L_{Nyquist} = \frac{\lambda}{4NA}.$$

Still, in various implementations, the optimization may be subject to the following constraints.

$$0 \leq U(r_{grid}) \leq t/(1+\Delta dose_{dark}/dose)(\text{dark layout features}) \tag{32}$$

$$I_{max} \geq U(r_{grid}) \geq t/(1-\Delta dose_{bright}/dose) \geq 1(\text{bright layout features}) \tag{33}$$

$$\alpha_{00} = \sum_k MM(-k) \cdot \frac{MTF(k)}{MTF(0)} \tag{34}$$

$$MM(k) = \frac{\iint_{MaskArea} |MaskTransmission|^2 e^{j(k_x x + k_y y)} dxdy}{L_x L_y} \tag{35}$$

In addition to the above described optimization constraints, the target layout, i.e. the layout pattern 907, may be modified. In various implementations of the invention, the corners of the layout pattern 907 are rounded. With some implementations, serifs are added to the corners. Still, some implementations may modify the layout pattern by application of an optical proximity correction process.

In various implementations of the invention, the optimization can be organized as follows.

$$W \cdot s \leq h \tag{36}$$

Where W is a matrix. The rows of W may be the Fourier cosines and sines for all valid m,n combinations, i.e. $k_{mn} \in \Omega$, evaluated as the specific edge or area sampling points. s is a vector comprised of the set of unknown Fourier coefficients, i.e. $s = [\alpha_{00} \; \alpha_{10} \; \beta_{10} \ldots \alpha_{MN} \; \beta_{MN}]^T$. h is a vector of threshold test values, such as for example $\pm t/(1+\Delta dose/dose)$, 0, 1.

Furthermore, with various implementations, each row of the W matrix may be the factors which multiply the Fourier Coefficients (s) for a specific constraint, which for the edge constraint may be represented as follows.

For $+\Delta dose$ Edge Constraint Row, $U(r_j^-) \leq t/(1+\Delta dose/dose)$:

$$W_{row=j} = [1 \; \cos(k_{10} \cdot r_j^-) \sin(k_{10} \cdot r_j^-) \ldots \cos(k_{MN} \cdot r_j^-) \sin (k_{MN} \cdot r_j^-)] \tag{37}$$

Corresponding to $h_j = t/(1+\Delta dose/dose)$.

For $-\Delta dose$ Edge Constraint Row, $U(r_j^+) \geq t/(1-\Delta dose/dose)$:

$$W_{row=j} = [-1 - \cos(k_{10} \cdot r_j^+) - \sin(k_{10} \cdot r_j^+) \ldots - \cos(k_{MN} \cdot r_j^+) - \sin(k_{MN} \cdot r_j^+)] \tag{38}$$

Corresponding to $h_j = -t/(1-\Delta dose/dose)$.

For the area constraint, the W matrix may be represented as follows.

For dark areas, $0 \leq U(r_j^{grid}) \leq t/(1+\Delta dose_{dose}/dose)$:

$$W_{row=j} = [1 \; \cos(k_{10} \cdot r_j^{grid}) \sin(k_{10} \cdot r_j^{grid}) \ldots \cos(k_{MN} \cdot r_j^{grid}) \sin(k_{MN} \cdot r_j^{grid})] \tag{39}$$

$$W_{row=j} = [-1 - \cos(k_{10} \cdot r_j^{grid}) - \sin(k_{10} \cdot r_j^{grid}) \ldots - \cos(k_{MN} \cdot r_j^{grid}) - \sin(k_{MN} \cdot r_j^{grid})] \tag{40}$$

Corresponding to $h_j = t/(1+\Delta dose_{dark}/dose)$ and $h_j = 0$ respectively.

For the bright areas, $I_{Max} \geq U(r_{grid}) \geq t/(1-\Delta dose_{bright}/dose) \geq 1$:

$$W_{row=j}=[-1-\cos(k_{10} \cdot r_j^{grid})- \sin(k_{10} \cdot r_j^{grid}) \ldots -\cos(k_{MN} \cdot r_j^{grid})-\sin(k_{MN} \cdot r_j^{grid})] \quad (41)$$

$$W_{row=j}=[1 \cos(k_{10} \cdot r_j^{grid}) \sin(k_{10} \cdot r_j^{grid}) \ldots \cos(k_{MN} \cdot r_j^{grid})\sin(k_{MN} \cdot r_j^{grid})] \quad (42)$$

Corresponding to $h_j=-t/(1+\Delta dose_{bright}/dose)$ and $h_j=I_{max}$ respectively.

Figure 11:
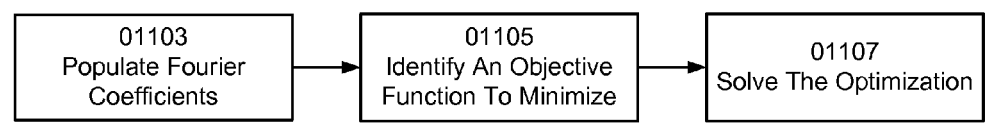
FIG. 11 illustrates a method of optimizing a mask.

With various implementations, the optimization may proceed according to the method 1101 shown in FIG. 11. As can be seen from this figure, the method 1101 includes an operation 1103 for populating the Fourier coefficient vector s with initial values. In various implementations of the invention, the operation 903 populates the Fourier coefficient vector s with the Fourier coefficients of the original target, i.e. the layout pattern 907 and the operation 1105 identifies as the objective function the steepest gradient function. Subsequently, the operation 1107 solves the optimization in a linear fashion.

With various implementations, the operation 1107 adds an auxiliary scalar variable g to the optimization to form $W \cdot s \leq h + g$. It follows that g can always be made large enough such that a solution exists. Accordingly, the minimum value of g for which a solution exists may be the optimum values of the Fourier coefficients. In some implementations, if $g \leq = 0$, the layout pattern 907 is said to be printable, while if $g > 0$, then the values for which $(W \cdot s - h)_j > 0$ identify areas where the layout pattern 907 is said to be unprintable or difficult to print.

As detailed above, techniques for performing a printability analysis have been disclosed. In various implementations, the method 501 may be embedded into a design process and utilized to accelerate the process. More particularly, various implementations of the invention may be employed to reduce the computational resources needed to perform some design processes, such as, for example, a lithographic friendly design process or a source mask optimization process. Various techniques for embedding the method 501 into a design process are described below.

Layout Analysis for Accelerating a Source Mask Optimization Process

Figure 10:
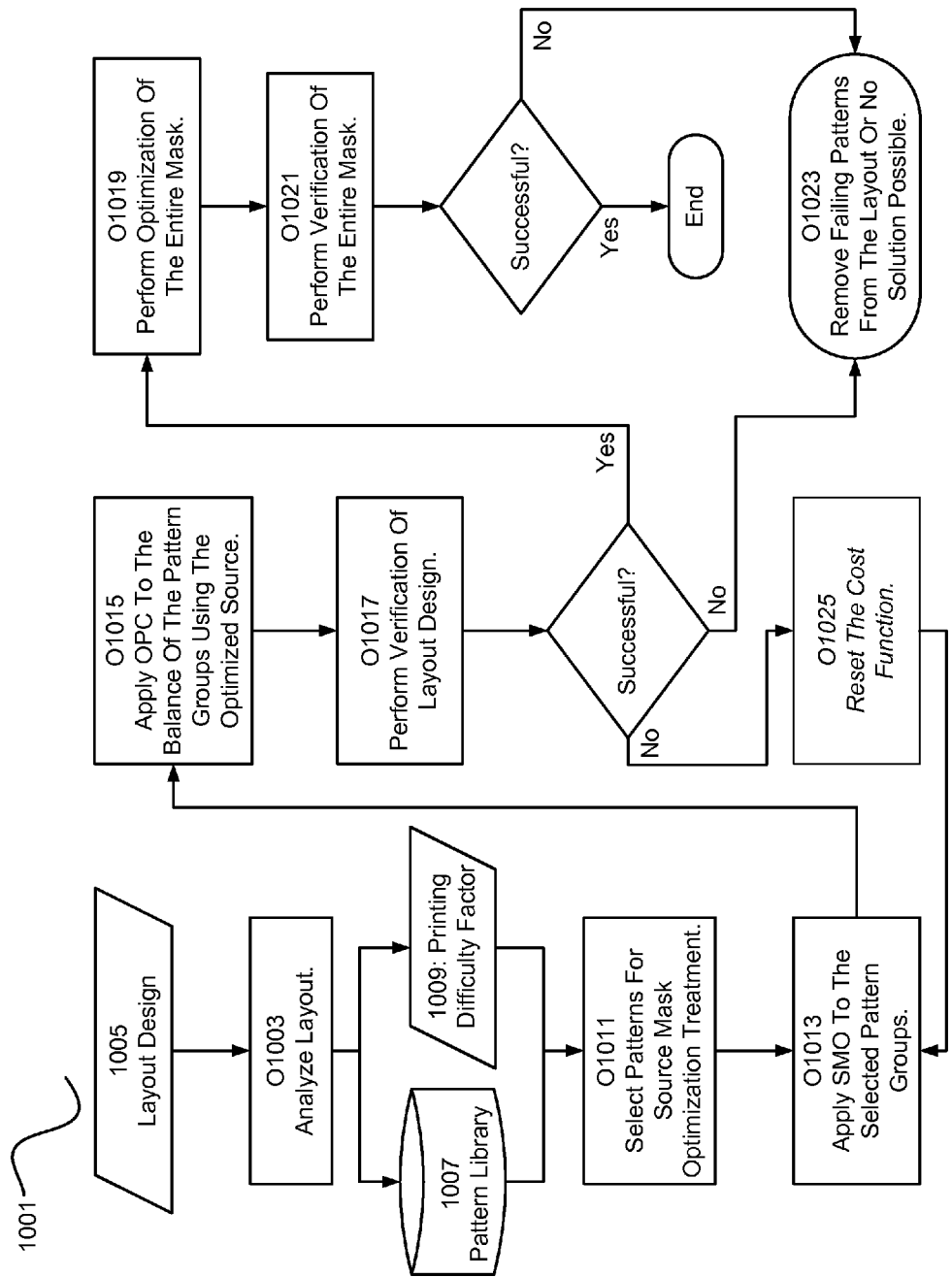
FIG. 10 illustrates an accelerated source mask optimization flow according to various implementations of the invention.

FIG. 10 illustrates an accelerated source mask optimization flow 1001. As can be seen from this figure, the method 1001 includes an operation 1003 to analyze a layout 1005. In various implementations, the operation 1003 performs the method 501 shown in FIG. 5. As can be seen, the operation 1003 generates a pattern library 1007 and a pattern group printing difficulty factor 1009. In various implementations, the pattern library includes the pattern groups 511 and the set of layout sections 507 discussed above. Accordingly, the pattern group printing difficulty factor 1009 corresponds to the pattern group printing difficulty 515.

The method 1001 further includes an operation 1011 for selecting patterns for source mask optimization treatment and an operation 1013 for applying a source mask optimization to the selected pattern groups. As described above, various implementations may apply the operations to a representative layout section for each pattern group. More particularly, the operations 1013 may apply a source mask optimization treatment to a section of the layout design 1005 that corresponds to each of the selected pattern groups.

The method 1001 includes a subsequent operation 1015 for apply an optical proximity correction process to the balance of the pattern groups. More particularly, the operation 1015 applies an optical proximity correction process to a section of the layout design 1005 that corresponds to each of the pattern groups that were not selected by the operation 1011. As shown, the operation 1015 performs optical proximity correction based upon the optimized source (i.e. by using the source variables optimized during the operations 1013.) Furthermore, an operation 1017 for performing a verification of the layout design is provided.

Additionally, as can be seen, an operation 1019 for performing an optimization of the entire mask and an operation 1021 for performing a verification of the entire mask are included in the method 1001. Finally, as can be seen if either of the verification operations (i.e. the operation 1017 or the operations 1021) fail, then the layout sections which correspond to the pattern groups causing the failure are removed from the layout by the operations 1023. More particularly, the layout sections corresponding to the pattern groups selected by the operation 1011 may be removed from the layout design by the operation 1023. In some implementations, the sections may be "flagged" for removal. That is to say, that the operations 1023 may generate an output marking the layout sections that caused the failure. Alternatively, the operations 1023 may mark the layout design as being unsuitable for full mask source mask optimization. This may either indicate that there is no theoretical solution o the source mask optimization problem or that it would require more computational resources that are reasonably allocated for a design.

Additionally, as can be seen, if the verification operation 1017 is unsuccessful, operation 1025 to reset the cost function used by the operations 1011 to select pattern groups may be provided. The operation 1025 is optional. In various implementations, the operations 1025 may reset the cost function to a lower value. More particularly, the operations 1025 may set the cost function such that the operations 1011 selects more patterns for subjection to source mask optimization by the operation 1013. With alternative implementations, the operation 1025 may rest the cost function to a higher value, such that the operations 1011 will select fewer patterns for subjection to source mask optimization by the operation 1013.

Pattern Group Selection

As indicated, the operations 1011 selects patterns based upon a cost functions. In various implementations, the cost function is given by the following equation:

$$\text{Cost}=F*D \quad (43)$$

Where F equals the frequency of the pattern and D equals the printing difficult factor.

As can be appreciated, those pattern groups which have a high printing difficulty factor (i.e. D) and a low frequency (i.e. F,) will have a higher than average cost. In various implementations, it may be advantageous to bias the cost function towards correcting only those pattern groups which have a high difficulty (i.e. those pattern who have a high difficult and which are very infrequent.)

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A computer implemented method comprising:
   identifying a layout design for a mask;
   partitioning the layout design into a plurality of layout sections;
   selecting a reference point in each of the layout sections;
   identifying layout sections that have similar geometric shapes relative to the reference point;

consolidating the plurality of layout sections into a plurality of pattern groups based upon the identified layout sections that have similar geometric shapes;

identifying (a) an optical lithographic system, (b) a set of optical lithographic tolerance parameters, and (c) a representative layout section for each of the pattern groups;

using a computer system to generate a simulated printed image corresponding to each of the representative layout sections using the optical lithographical system;

determining which of the simulated printed images do not fall within the optical lithographic tolerance parameters;

optimizing the layout design of the mask by modifying the layout sections whose simulated images do not fall within the optical lithographic tolerance parameters such that the mask falls within the image tolerance parameters; and fabricating the mask according to the optimized layout design.

2. The computer implemented method recited in claim 1, further comprising saving the one or more selected layout sections to a memory storage location.

3. The computer implemented method recited in claim 1, further comprising applying a source mask optimization to the simulated printed images that do not fall within the optical lithographic tolerance parameters.

4. The computer implemented method recited in claim 1, wherein the act of partitioning the layout design into a plurality of layout sections comprises:
    identifying a partition distance; and
    splitting the layout design into layout sections of a similar geometric area, the geometric area being based in part upon the partition distance.

5. The computer implemented method recited in claim 1, wherein the act of consolidating the plurality of layout sections into the plurality of pattern groups comprises:
    only identifying layout sections as having similar geometric shapes if layout features within a predetermined distance outside the dimensions of the layout sections also have similar geometric shapes.

6. The computer implemented method recited in claim 1, wherein the act of determining which of the simulated printed images fall within the optical lithographic tolerance parameters comprises generating a pattern group difficulty factor for each of the simulated printed images, based upon both (a) a target intensity for the simulated printed image and (b) a simulated intensity for the simulated printed image.

7. A method for fabricating a mask using one or more computer-readable devices storing software instructions for enabling a computer to perform a set of operations, the set of operations comprising:
    identifying a layout design for a mask;
    partitioning the layout design into a plurality of layout sections;
    identifying a plurality of unique patterns based upon the geometric relationships of shapes in the layout section;
    consolidating the plurality of layout sections into a plurality of pattern groups by grouping those layout sections that have the same unique pattern into the same pattern group;
    identifying (a) an optical lithographic system, (b) a set of optical lithographic tolerance parameters, and (c) a representative layout section for each of the pattern groups;
    the method comprising:
    loading the one or more computer-readable devices into a computer system;
    using the computer system to generate a simulated printed image corresponding to each of the representative layout sections using the optical lithographical system;
    determining which of the simulated printed images do not fall within the optical lithographic tolerance parameters;
    using the set of operations to optimize the layout design of the mask such that the layout sections corresponding to the simulated printed images that did not fall within the image tolerance parameters fall within the image tolerance parameters in the optimized layout design; and
    fabricating the mask according to the optimized layout design.

8. The method recited in claim 7, the set of operations further comprising saving the one or more selected layout sections to a memory storage location.

9. The method recited in claim 7, the set of operations further comprising deriving a printing difficulty factor for each of the pattern groups.

10. The method recited in claim 7, the operation for partitioning the layout design into a plurality of layout sections comprising:
    identifying a partition distance; and
    splitting the layout design into layout sections of a similar geometric area, the geometric area being based in part upon the partition distance.

11. The method recited in claim 7, wherein the act of using the set of operations to optimize the layout design of the mask comprises using a modulation transfer function to represent an image intensity.

12. The method recited in claim 7, wherein the operation for determining which of the simulated printed images fall within the optical lithographic tolerance parameters further comprises generating a pattern group difficulty factor for each of the simulated printed images, based upon both (a) a target intensity for the simulated printed image and (b) a simulated intensity for the simulated printed image.

13. A method for fabricating a mask using an optical lithographic system comprising:
    partitioning a layout design for a mask into a plurality of layout sections;
    identifying layout sections that have similar geometric shapes;
    consolidating the layout sections into a smaller plurality of pattern groups by placing the layout sections that have similar geometric shapes into the pattern group for layout sections that have that similar geometric shape;
    identifying a set of optical lithographic tolerance parameters for the optical lithographic system;
    identifying a representative layout section for each of the pattern groups;
    generating a simulated printed image corresponding to each of the representative layout sections;
    determining which of the simulated printed images do not fall within the optical lithographic parameters;
    modifying the layout design of the mask such that all the simulated printed images of the modified design fall within the optical lithographic parameters; and
    fabricating the mask according to the modified layout design.

14. The method of claim 13, wherein the act of determining which of the simulated images do not fall within the optical lithographic parameters comprises deriving a printing difficulty factor.

15. The method recited in claim 13, wherein the simulated image is generated using a modulated transfer function to represent image intensity.

16. The method of claim 13, wherein the act of consolidating the layout sections comprises only identifying layout sections as having similar geometric shapes if layout features within a predetermined distance outside the dimensions of the layout sections also have similar geometric shapes.

* * * * *